United States Patent
Rilby et al.

(10) Patent No.: US 11,365,941 B2
(45) Date of Patent: Jun. 21, 2022

(54) THERMAL ENERGY STORAGE ASSEMBLY

(71) Applicant: Azelio AB, Amal (SE)

(72) Inventors: Erik Rilby, Gothenburg (SE); Henrik Wikström, Västra Frölunda (SE); Torbjörn Lindquist, Skattkärr (SE); Daniel Gloss, Billdal (SE)

(73) Assignee: AZELIO AB, Amal (SE)

( * ) Notice: Subject to any disclaimer, the term of this patent is extended or adjusted under 35 U.S.C. 154(b) by 0 days.

(21) Appl. No.: 17/242,475

(22) Filed: Apr. 28, 2021

(65) Prior Publication Data

US 2021/0247148 A1    Aug. 12, 2021

Related U.S. Application Data

(63) Continuation of application No. PCT/SE2019/051077, filed on Oct. 29, 2019.

(30) Foreign Application Priority Data

| Oct. 29, 2018 | (SE) | ..................... 1851338-2 |
| Oct. 29, 2018 | (SE) | ..................... 1851339-0 |
| May 14, 2019 | (SE) | ..................... 1950569-2 |

(51) Int. Cl.
*F28D 20/02*  (2006.01)

(52) U.S. Cl.
CPC .................. *F28D 20/025* (2013.01)

(58) Field of Classification Search
CPC ...... F28D 20/025; F28D 20/02; F28D 20/026; F28D 20/021; F28D 15/06; F28D 20/028; F24S 60/10

(Continued)

(56) References Cited

U.S. PATENT DOCUMENTS

| 6,138,746 A | * | 10/2000 | Livolsi .................. F25D 3/005 |
| | | | 165/910 |
| 6,634,417 B1 | * | 10/2003 | Kolowich .......... A47G 19/2288 |
| | | | 165/902 |

(Continued)

FOREIGN PATENT DOCUMENTS

| CN | 206095016 U | 4/2017 |
| CN | 206531418 U | 9/2017 |

(Continued)

*Primary Examiner* — Jon T. Schermerhorn, Jr.
(74) *Attorney, Agent, or Firm* — Gabriela B. Tomescu, Esq.; Bergenstråhle & Partners AB

(57) ABSTRACT

An assembly for storing thermal energy comprising a phase change material, PCM, storage vessel and at least one heat transfer fluid, HTF, receptacle, the PCM storage vessel being defined by a thermally conductive wall 108, the PCM storage vessel 100 comprising an inverted tapered portion, the inverted tapered portion having a tip portion and a base portion, the tip portion having a diameter less than the diameter of the base portion, the tip portion being arranged relatively beneath the base portion, the at least one HTF receptacle being provided adjacent to and in thermal communication with at least a portion of the PCM storage vessel, thermal communication between the PCM storage vessel and the at least one HTF receptacle occurring via the thermally conductive wall, and wherein the HTF receptacle comprises a portion for receiving thermal energy from an external thermal energy source, the said the portion being adjacent the tip portion of the inverted tapered portion.

20 Claims, 5 Drawing Sheets

(58) Field of Classification Search
USPC .......................................................... 165/10
See application file for complete search history.

(56) References Cited

U.S. PATENT DOCUMENTS

| | | | |
|---|---|---|---|
| 6,672,371 B1* | 1/2004 | Amerman | E21B 33/13 |
| | | | 166/57 |
| 8,640,689 B1* | 2/2014 | Kribus | F24S 20/20 |
| | | | 126/643 |
| 9,732,988 B1 | 8/2017 | Spero et al. | |
| 10,203,164 B2* | 2/2019 | Olsen | F28D 20/028 |
| 10,218,042 B2* | 2/2019 | Kuhne | H01M 10/6551 |
| 10,422,587 B2* | 9/2019 | Yang | F28D 20/0034 |
| 2010/0078440 A1* | 4/2010 | Bargan | F24V 30/00 |
| | | | 220/592.2 |
| 2013/0192792 A1 | 8/2013 | Krakow et al. | |
| 2017/0102192 A1 | 4/2017 | Olsen et al. | |
| 2021/0147086 A1* | 5/2021 | Rathay | B64C 1/10 |

FOREIGN PATENT DOCUMENTS

| | | |
|---|---|---|
| DE | 4100818 A1 | 7/1992 |
| WO | 2017/173499 A1 | 10/2017 |

\* cited by examiner

THERMAL ENERGY STORAGE ASSEMBLY

FIELD OF THE INVENTION

The present disclosure relates to an assembly for storage of thermal energy. In particular it relates to an assembly comprising an PCM storage vessel in direct thermal communication with a HTF receptacle via a thermally conductive wall. The HTF receptacle comprises a region for receiving thermal energy from an external thermal energy source.

BACKGROUND OF THE INVENTION

A new aspect of electricity generation is that energy generated when energy is less costly to produce, such as during the daytime when sunlight is readily available for photovoltaic systems, or when high winds are available for wind power generation systems could be stored such that the energy can be used when energy is less readily available, for example, there is less sunlight or wind.

To this end thermal energy storage systems for storing thermal energy generated during periods of sunlight are known in, for example, concentrated solar power systems. A thermal energy storage system may comprise a two-tank system comprising, for example, three heat exchangers. The first of the two tanks is a hot tank comprising a medium capable of storing thermal energy, the second of the two tanks is a cold tank comprising a medium for storing thermal energy. The system further comprises a heat transfer fluid which is used to indirectly transfer thermal energy from the hot tank via a heat exchanger, to a system or device for generating electrical energy via a heat exchanger. The energy extraction of the heat transfer fluid results in the heat transfer fluid having a reduced temperature compared with the heat transfer fluid entering the heat exchanger for the electrical energy generator, the thermal energy remaining in the lower temperature heat transfer fluid is then transferred to the medium for storing thermal energy in the cold tank. Generally this second transfer happens via a third heat exchanger. The existing systems generally use two tanks and a heat transfer fluid as the medium for storing heat energy in the tanks may be unsuitable for pumping as a heat transfer fluid, and furthermore, the respective temperatures of the hot and cold tanks, and the energy storage medium therein, may be so great that the same material may be unsuitable for both tanks. That is, two different energy storage mediums may be required.

The energy storage mediums may be phase change materials (PCMs). A phase change material is a material which is capable of storing and releasing large amounts of energy when the material changes from a solid to a liquid and vice versa. A PCM is generally a material which absorbs energy during heating as a phase change from e.g. a solid to a liquid. The PCM may release energy during the reversed cooling process. During heating of the PCM in a solid phase the solid increases temperature (sensible energy storage). During phase change from solid to liquid energy is stored latently. After phase change to a liquid, energy is again stored sensibly and the PCM in liquid phase increases temperature.

An issue with PCMs is that a cool, solidified, PCM generally has a lower thermal conductivity than the liquid phase PCM. Existing thermal energy storage systems have investigated complex encapsulation techniques for the PCM to reduce the effects of solidification on performance. These may entail encapsulation in small capsules or beads, or encapsulation of the PCM in a matrix of cylinders (heat pipes) inside a storage vessel. Each of these encapsulations techniques result in complex, expensive thermal energy storage systems and PCM vessels.

The above two-tank systems are known in concentrated solar power systems, the use of such thermal energy storage systems in combination with other electrical generation systems is not to-date performed. Furthermore, simpler, less costly and more robust systems of thermal energy storage are required which reduce production, installation and maintenance complexity.

US 2013/0192792 A1 describes a thermal energy storage system including multiple thermal energy storage containers. The containers have high emissivity inner surfaces that are adapted to radiate heat into a stored thermal energy storage media. As described above, storing PCM in a series of heat pipes, or containers is a complex solution, as several, narrow pipes are necessary due to the low thermal conductivity of solid PCM.

Improved systems that are less complex are necessary for industrial use of thermal energy storage systems in practice.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing an assembly for storing thermal energy comprising a phase change material (PCM) storage vessel and at least one heat transfer fluid (HTF) receptacle, the PCM storage vessel being defined by a thermally conductive wall, the PCM storage vessel comprising an inverted tapered portion, the inverted tapered portion having a tip portion and a base portion, the tip portion having a diameter less than the diameter of the base portion, the tip portion being arranged relatively beneath the base portion, the at least one HTF receptacle being provided adjacent to and in thermal communication with at least a portion of the PCM storage vessel, thermal communication between the PCM storage vessel and the at least one HTF receptacle occurring via the thermally conductive wall, and wherein the HTF receptacle comprises a portion for receiving thermal energy from an external thermal energy source, the said the portion being adjacent the tip portion of the inverted tapered portion.

A system for the storage of thermal energy comprising a plurality of assemblies is also provided.

A system for the generation of electrical energy from thermal energy is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
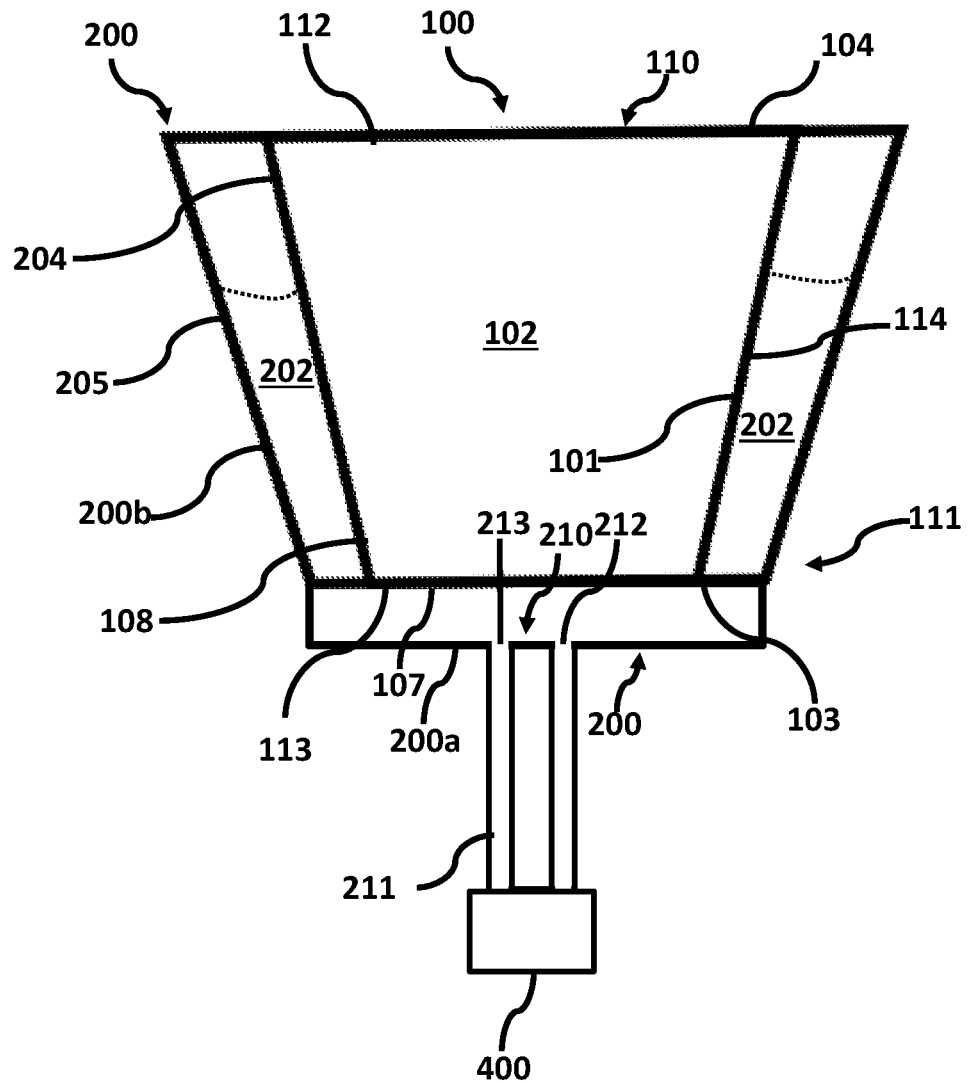
FIG. 1 is a cross-sectional side view of an assembly for the storage of thermal energy comprising a PCM storage vessel and a HTF receptacle according to an aspect.
Figure 2:
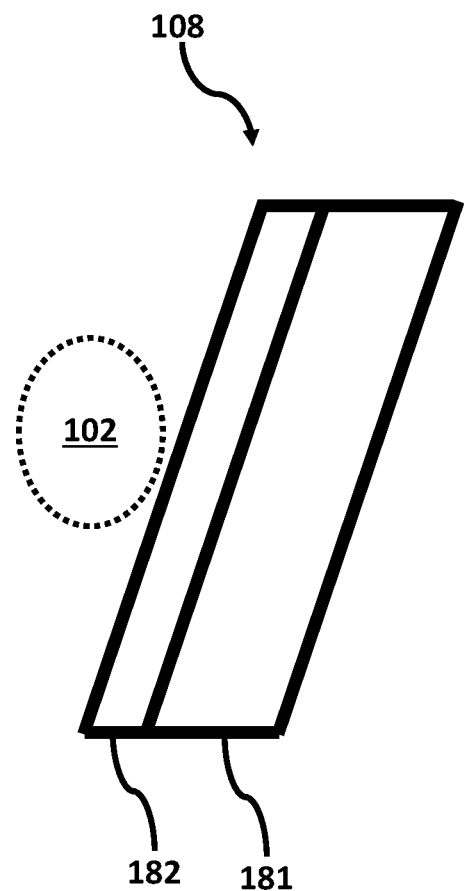
FIG. 2 is a schematic of a wall of a PCM storage vessel according to an aspect.

FIG. 1 shows an assembly for thermal energy storage comprising a phase change material (PCM) storage vessel 100 and a heat transfer fluid (HTF) receptacle 200, the PCM storage vessel 100 is defined by a thermally conductive wall 108. The HTF receptacle 200 is provided adjacent to and in thermal communication with at least a portion of the of the PCM storage vessel 100. The HTF receptacle 200 has a portion 210 for receiving thermal energy from an external thermal energy source 400.

Thermal energy may be provided to HTF in the HTF receptacle 200 at the portion for receiving thermal energy 210 from the external thermal energy source 400. Thermal energy is thereafter transferred to the PCM via at least conduction from the HTF and through the thermally conductive wall 108. The thermal energy may therein be stored in the PCM for extraction and use at a later time.

The assembly is an efficient thermal energy storage means which is less complex and more efficient than existing two tank systems.

Thermal energy to be input to the thermal energy storage assembly is ideally waste energy, overflow, or curtailment energy which can be input during periods when such energy is available. The thermal energy can be extracted and for example, used to generate electrical energy, when such waste energy, overflow or curtailment energy is not available.

The PCM storage vessel comprises an inverted tapered portion 101. The inverted tapered portion 101 has a tip portion 103 and a base portion 104. The base portion 104 is wider relative the tip portion 103. The tip portion 103 is arranged beneath the base portion 104. The tip portion 103 has a smaller cross-sectional area than the base portion 104.

The PCM storage vessel 100 may be rotationally symmetric as is shown in FIG. 1, however, it does not need to be.

Figure 3:
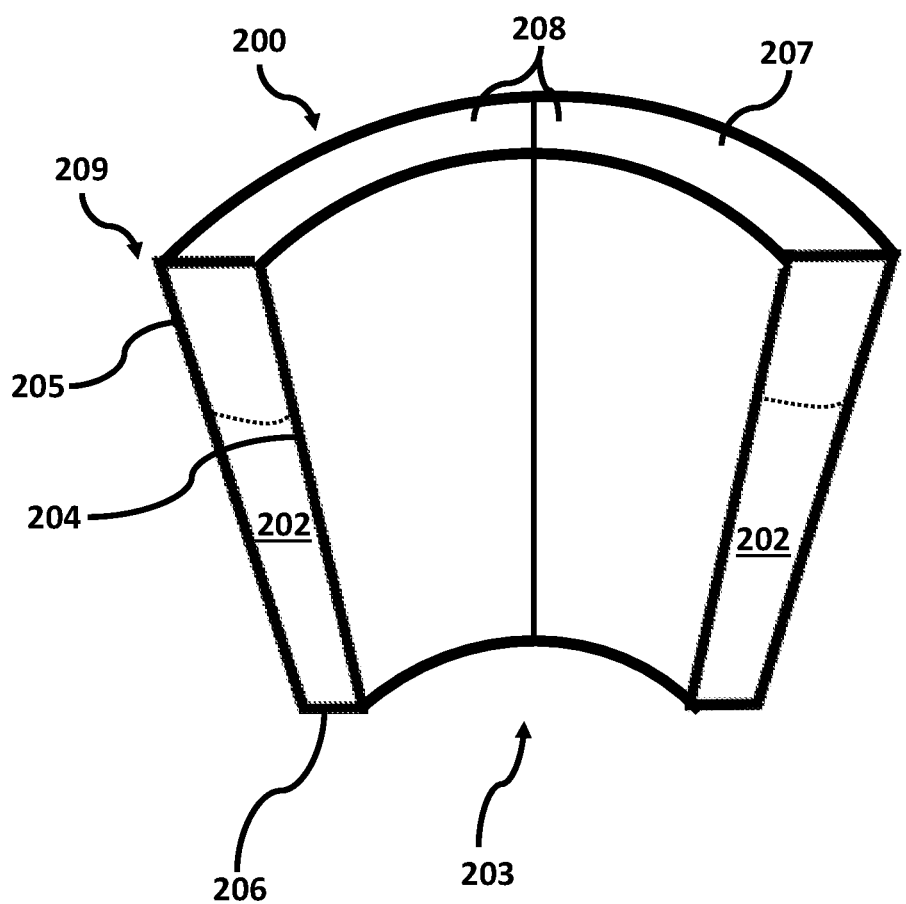
FIG. 3 is a cross-sectional view of a HTF receptacle according to an aspect.
Figure 4:
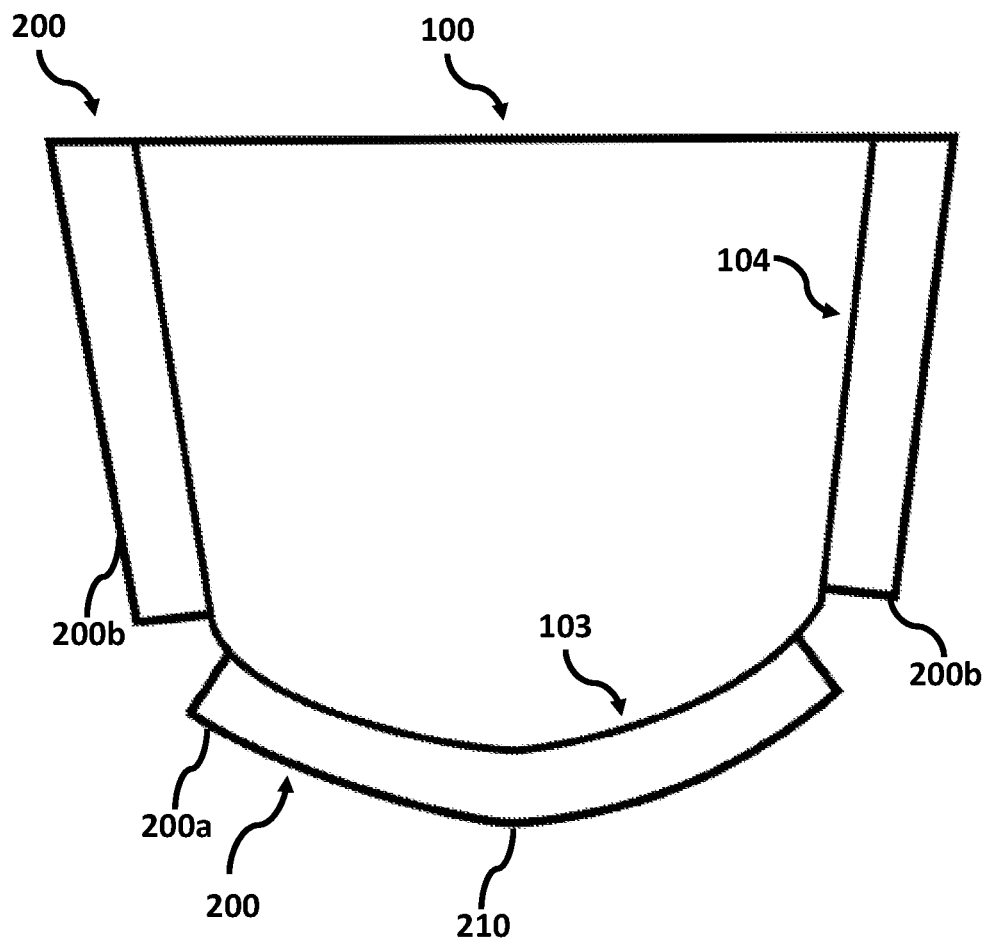
FIG. 4 is a cross-sectional side view of a PCM storage vessel and a HTF receptacle according to an aspect.
Figure 5:
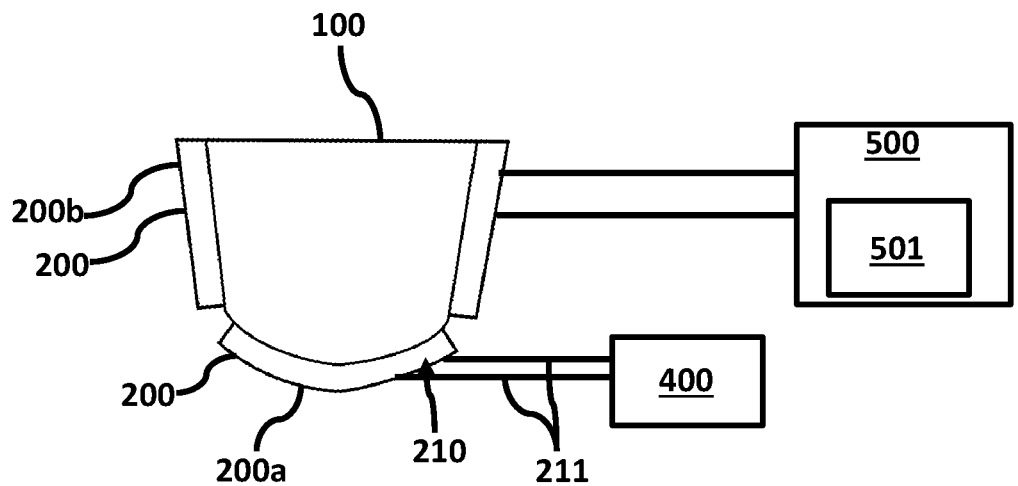
FIG. 5 is a schematic of a system for the storage of thermal energy and production of electrical energy according to an aspect.

As shown in FIG. 1 the tip portion 103 may have a flat base such that the bottom-most part of the PCM storage vessel 100 is flat. As shown in FIGS. 3 and 4 the tip portion 103 may be rounded such that the tip portion 103 is partially dome shaped, or convex. The lowermost face 107 of the PCM storage vessel 100 may form the tip portion 103.

The PCM storage vessel 100 is formed by a wall 108 enclosing a PCM storage region thus forming a PCM 102 receptacle. The wall may comprise tapered portion 101 and a non-tapered portion. The wall 108 may comprise a plurality of separate members which are joined to form a single wall 108. For example, the wall may comprise an upper lid 112 or covering 112, at least one lateral wall 114 at the side(s) of the PCM storage vessel 100, and a base 113 or bottom wall 113. Traditionally PCM storage vessels have been designed with walls that are thermally insulating. At least a portion of the wall 108 of the present PCM storage vessel may be substantially thermally conductive, that is, non-thermally insulating, such that heat may transfer from the PCM 102 in the PCM storage vessel 100, through the wall 108, and in to elements in thermal contact with the wall of the PCM storage vessel 100. The plurality of separate wall members may each have a different thermal conductivity. The plurality of separate wall members may have the same thermal conductivity. The lateral wall 114 of the PCM storage vessel may be the thermally conductive portion of the wall 108. The entire wall 108 of the PCM storage vessel 100 may be thermally conductive.

The term tapered used herein is used in the general sense to describe a vessel having a three-dimensional shape with a region of greater diameter at an upper base portion 104 and a region of reduced diameter at a lower tip portion 103. The tapered portion 101 may be a frusto-conical tapered portion 101 wherein the taper is formed by a part of a cone. The tapered portion 101 may be an oblique frusto-conical portion 101 wherein the taper is formed by a part of an oblique cone. In FIG. 1 the tapered portion 101 is a frusto-conical tapered portion. The tapered portion forms a receptacle for PCM 102, The tapered portion 101 is arranged with the lower tip portion 103 beneath the upper greater diameter portion 104 such that heavier particles move, under the force of gravity, towards the tip portion 103.

FIG. 4 shows the tapered portion 101 of the PCM storage vessel 100 wherein the tapered portion 101 comprises a tip portion 103 being a convex protrusion. The base 113 of the wall 108 of the tapered portion 101 may be convex such that the tapered portion 101 has a portion which is a convex protrusion. The convex protrusion 101 may be coaxial with the central longitudinal axis L of the PCM storage vessel 101. That is, the convex protrusion 101 may be located centrally on the PCM storage vessel 100, substantially equidistance from the lateral perimeter of the PCM storage vessel 100. The convex protrusion 101 may be located laterally offset from the center of the PCM storage vessel 100. That is, the convex protrusion 101 may be located such that distance of the center point of the convex protrusion is laterally offset from the center of the PCM storage vessel. The convex protrusion at the tip portion 103 has benefits with respect to flow dynamics within the PCM storage vessel 100 as there are no or fewer corners where solidified PCM 102 may collect.

In FIG. 4 the PCM storage vessel 100 comprises a tapered portion 101 being a frusto-conical portion 101 and having a convex protrusion at the tip 103. The benefits of the convex protrusion are as noted above with respect to the coolest and most dense PCM 102 gathering in region within the PCM vessel 100 at the convex protrusion at the tip 103. The HTF receptacle 200 may be formed to correspond to the convex protrusion at the tip 103. That is, the HTF receptacle 200 may have an upper surface, arrangeable adjacent to the PCM vessel 100, which is curved in a substantially concave form to correspond to the convex shape of the convex tip portion 103 of the PCM vessel 100.

The PCM storage vessel may comprise an upper portion 110 which is substantially cylindrical. The upper portion 110 and the tapered portion 101 may be connected at the base 104 of the tapered portion. The upper portion 110 is above the tapered portion 101. Both the upper portion 110 and the tapered portion 101 may form the receptacle for PCM 102. The upper-portion 110 and the tapered portion 101 may form a single receptacle. The receptacle may have no internal dividers. The upper portion 110 may have a volumetric capacity greater than the tapered portion 101. During use, more PCM 102 may be present in the upper portion 110 than in the tapered portion 101. This may allow the advantageous passive circulation of PCM 102 whilst maintaining a large volumetric capacity of the vessel 100.

The PCM storage vessel 100 may be substantially sealed such that PCM 102 is not exposed to the ambient environment in which the storage vessel 100 is located. There is no inflow nor outflow of PCM to or from the PCM storage vessel 100 during provision and/or extraction of thermal energy to the PCM 102. The PCM storage vessel 100 may be sealed at its upper portion 110 and at its lower portion 111. As would be understood the sealing of the PCM storage vessel 100, does not preclude the presence of outlets and inlets comprising openable and closeable valves which are openable for the delivery and/or release of fluids such as gasses during operation maintenance. Sealing of the PCM storage vessel 100 enables better heat energy maintenance within the vessel 100. A sealed PCM storage vessel 100 may also be described as an enclosed PCM storage vessel 100. During the provision or extraction of thermal energy the PCM storage vessel 100 may be enclosed. The PCM storage vessel may be openable for maintenance. The covering 112, or lid member 112 for sealing the upper portion 110 of the PCM storage vessel 100 may be a flat covering 112. The covering 112 may be curved, such as partially dome-shaped.

The wall 108 of the PCM storage vessel 100 may comprise a metallic layer 181. The wall 108 may further comprise an additional layer being a ceramic 182. The material and/or thickness of the metallic layer 181 may be selected such that the metallic layer 181 is thermally conductive. The material and/or thickness of the ceramic layer 182 may be selected such that the ceramic layer 182 is thermally conductive. The ceramic layer 182 may form the internal layer. The metallic layer 181 may be the outer layer. The ceramic layer 182 may be arranged on the internal surface of the wall 108, such that PCM 102 is in contact with the ceramic layer 182. In such an arrangement the ceramic layer 182 forms an internal surface of the wall 108 and the metallic layer 181 forms an external surface of the wall 108. The ceramic layer 182 forms a coating on the inner, wetted portion of the thermally conductive wall 108.

The metallic layer 181 may comprise, such as be composed of, stainless steel, such as an austenitic chromium nickel stainless steel alloy comprising nitrogen and rare earth metals. The metallic layer 181 may be designed to be used at temperatures greater than about 550° C. The metallic layer 181 may comprise for example stainless steel of type EN 1.4835. The metallic layer 181 may have a thickness of from about 0.5 mm to about 10 mm, such as from about 1 mm to about 5 mm, such as about 3 mm. The metallic layer 181 is substantially non-wetting, that is, the PCM 102 is not in contact with the metallic layer 181.

The ceramic layer 182 may comprise, such as be composed of, boron-nitride, aluminum oxide ($Al_2O_3$), and/or another ceramic material having a suitable thermal conductivity. The ceramic layer 182 may have a thickness of from about 0.01 mm to about 1 mm, such as from about 0.2 mm to about 0.4 mm. A thicker ceramic layer 182 is not advantageous as it may split or crack. The ceramic layer 182 may have a thermal conductivity greater than the thermal conductivity of the metallic layer 181. The ceramic layer 182 may have a heat transfer rate of 100-200 times that of the metallic layer 181. The ceramic layer 182 is non-insulating. The ceramic layer 182 is in contact with the PCM 102. A thermally conductive ceramic layer 182 increases the thermal conductivity of the wall of the PCM storage vessel 100. The ceramic layer 182 furthermore enables the use of a PCM which may otherwise react with a metallic walled vessel. The ceramic layer 182 may comprise a plurality of sub-layers, where each sub-layer comprises, or is composed of a ceramic material.

The above described PCM storage vessel 100 wall 108 design is furthermore lightweight which reduces installation and maintenance complexity and cost. Furthermore, a thermally conductive PCM storage vessel 100 wall 108 enables the efficient extraction of thermal energy compared to systems where thermal energy from the PCM 102 is extracted via separate heat exchangers and requires fluid transfer with associated losses.

The PCM 102 may be a known phase change material. The PCM may be an inorganic PCM, such as, molten salt, a metallic alloy, or the like. Preferably, the PCM 102 for use in the present PCM storage vessel 100 is a composition comprising aluminum and silicon, such as eutectic Aluminum Silicon Alloy, AlSi12. The PCM 102 may be an aluminum-silicon composition comprising silicon at a ratio of from about 10% to about 13% by weight, such as about 12.6%. The temperature at which the PCM 102 melts may be from about 570° C. to about 590° C., such as about 580° C. As is the case with a PCM the PCM undergoes phase changes from solid to liquid, and liquid to solid, during thermal energy storage and thermal energy extraction. The PCM 102 may be present in both solid and liquid phases throughout the PCM storage vessel 100. The PCM 102 may be initially provided to the PCM storage vessel 100 in a solid phase. The PCM may undergo a solid-liquid phase change at temperature of greater than 100° C., such as greater than 200° C. Due to the high temperatures at which the PCM storage vessel operates, and the thermal energy storage requirements water is not a suitable PCM.

Molten and/or solid PCM 102 may be free to circulate passively throughout the PCM storage vessel 100. The PCM 102 may be un-encapsulated, that is, it may be free from any form of encapsulation separating portions of PCM 102 from each other.

The PCM storage vessel 100 may comprise a volume of PCM 102 greater than about 5 L, such as greater than about 50 L of PCM. The PCM storage vessel may comprise from about 500 L to about 2500 L of PCM, such as from about 1000 L to about 2000 L, or more specifically, from about 1600 L to about 1700 L, or about 1630 L of PCM 102.

The PCM storage vessel 100 advantageously uses the effect of gravity on the PCM 102 such that, during warming of the PCM 102, the relatively cooler and possibly solidified portions of PCM 102 are amassed at the bottom of the vessel in the tip portion 103 of the tapered portion 101. Whereupon it is heated by the HTF in the HTF receptacle 200 and may rise within the vessel 100 to the base portion 104. The PCM 102 may thus be warmed within the vessel 100 passively, effectively, and efficiently. As opposed to other heat storage mediums which are maintained in a liquid phase, such as a heat transfer fluid (HTF), in a PCM the relatively cooler portion may be a solid and have significantly reduced heat transfer properties compared to the liquid phase and therefore. The solidified PCM has less volume compared to liquid phase PCM. On solidification, in a PCM storage vessel without a tapered portion, a gap may form between the inner wall of the PCM storage vessel and the solidified PCM. The gaps have very poor heat transfer properties. The tapered portion 101 of the present PCM storage vessel 100 limits the formation of gaps as solidified PCM 102 is directed, due to gravity, downward toward the bottom of the tip portion 103. Furthermore, in a typical non-tapered vessel, cylinders or columns, having a cross-section approximating the cross-section of the vessel, may form within the vessel. The tapered portion 101 of the present PCM storage vessel 100 inhibits the formation of such cylinders or columns as the solidified PCM is directed towards the bottom of the tip portion 103.

As opposed to existing PCM storage vessels, the present PCM storage vessel 100 may be substantially free from internal structures such as a pipes, matrices, or the like for holding and sectioning the PCM 102. The total mass of PCM 102 in an assembly is enclosed within a single partition. The PCM storage vessel 100 may be considered a single tank for holding the entire volume of PCM 102 present in the thermal energy storage assembly. The internal volume of the PCM storage vessel 100 may be a single partition.

The receptacle 200 for heat transfer fluid (HTF) 202 is provided adjacent to and in thermal contact with at least a portion of the PCM storage vessel 100. The receptacle for HTF 200 abuts at least a portion of the PCM storage vessel 100. An assembly comprising the PCM storage vessel 100 and the receptacle for HTF 200 is thus provided.

The receptacle for HTF 200 may surround at least a portion of the PCM storage vessel 100. The receptacle 200 may form a sleeve around a portion of the PCM storage vessel 100. The HTF receptacle 200 may surround a portion of the tapered portion 101 and/or the upper portion 110 of the PCM storage vessel 100. The HTF receptacle 200 may surround the majority of the PCM vessel 100.

Thermal energy stored in the PCM 102 may be transferred to the HTF 202 via the wall 108 of the PCM storage vessel 100.

The HTF receptacle 200 may be defined as a receptacle having an inner wall 204 arrangeable adjacent the wall of the PCM storage vessel 100, an outer wall 205, and a member 206 connecting the inner wall 204 to the outer wall 205.

The inner wall of the HTF 204 receptacle may be thermally conductive such that thermal energy is transferred from the PCM 102 to the HTF 202, via the wall 108 of the PCM storage vessel 100 and the inner wall 204 of the HTF receptacle 200. The outer wall 205 of the HTF receptacle 200 may be thermally insulating.

The HTF receptacle has a portion for receiving thermal energy 210. The portion for receiving thermal energy 210 receives thermal energy from an external source of thermal energy 400. The term external as used herein refers to a source of thermal energy that is not in direct communication with the PCM storage vessel 100. It does not act directly on the PCM storage vessel 100. The term external also refers to that the external thermal energy source is also a source of thermal energy 400 not being the PCM 102 in the PCM storage vessel 100. The external source of thermal energy 400 is not in direct thermal communication with the PCM storage vessel 100. The external source of thermal energy 400 is in indirect thermal communication with the PCM storage vessel 100 via the HTF receptacle 200, and in particular via the HTF in the receptacle 200. The external source of thermal energy 400 acts upon the HTF in the HTF receptacle 200. The external source of thermal energy 400 is such that it increases the average temperature of the HTF and the PCM in the assembly during operation. That is, the average thermal energy stored in the assembly is increased via the external source of thermal energy 400.

Thermal energy provided to the PCM 102 in the PCM vessel 100 may be substantially received at a first portion 200a of the at least one HTF receptacle 200. The first portion 200a is adjacent to and in thermal communication with the PCM storage vessel 100. Receiving thermal energy refers to that the temperature of the HTF at the portion for receiving thermal energy 210 is greater than the average temperature of the HTF in the receptacle 200, and/or the first portion 200a of the receptacle 200. That is, the temperature of the HTF is increased at the portion for receiving thermal energy 210.

Thermal energy which may be extracted from the PCM 102 in the PCM storage vessel 100 is substantially extracted at a second portion 200b of the at least one HTF receptacle 200. The second portion 200b is adjacent to and in thermal communication with the PCM vessel 100. To extract thermal energy from the HTF receptacle 200 HTF may be pumped to a device which uses the thermal energy. The HTF is thereafter returned to the HTF receptacle 200. Extracting thermal energy refers to that the temperature of the HTF which is returned to the HTF receptacle 200 after thermal energy extraction is lower than the average temperature of the HTF in the receptacle 200, and/or the second portion 200b.

In some instances, the first and second portions may be separate first and second HTF receptacles 200a, 200b. The assembly therein may be considered to comprise a plurality of separate HTF receptacles 200a, 200b. The HTF receptacles may be separated via an air-gap of similar such that they are not in direct thermal communication with each other. They are in indirect thermal communication via the PCM storage vessel 100. Each of the separate HTF receptacles 200, 200a, 200b encloses a separate volume of HTF, which does not mix during operation of the thermal energy storage assembly.

Separate HTF receptacles 200a, 200b, enable maintenance of each of the receptacles 200a, 200b to be performed separately. For example, it is possible to perform maintenance of the second receptacle 200b, whilst the first receptacle 200a continues to receive thermal energy. Separate receptacles also enable the processes of provision of thermal energy to be separated from the extraction of thermal energy from the assembly, for example allowing energy to be supplied without needing to heat the total volume of HTF in the assembly.

The first portion 200a is generally proximal the tip portion 103 of the PCM storage vessel 100. As thermal energy is generally provided to the assembly at the first portion 200a and the tip portion 103 is beneath, that is relatively lower, the base portion 104, the PCM 102 is heated at its lower portion. The heated PCM 102, due to its reduced density may flow upward passively within the PCM storage vessel 100.

The second portion 200b is generally distal the tip portion 103 of the PCM storage vessel 100. The second portion 200b is therefore proximal the base portion 104 of the PCM storage vessel 100. Thermal energy may be extracted at the second portion 200b.

The first portion 200a may have a corresponding shape to the tip portion 103 of the PCM storage vessel 100. For example, if the tip portion 103 of the PCM storage vessel 100 is flat the first portion 200a may be substantially flat. If the tip portion 103 is dome or convex shaped, then the first portion 200a may be correspondingly concave such that the dome is surrounded by the first portion 200a of the HTF receptacle 200. The first portion 200a may be at the tip portion 103 of the inverted tapered portion 101. The first portion 200a may be considered to abut the tip portion 103 of the inverted tapered portion 101. The first portion 200a may be arranged to substantially cover the tip portion 103 of the inverted tapered portion 101.

The PCM storage vessel 100 and HTF receptacle 200 is used for thermal energy storage. Thermal energy may be provided to the PCM 102 which is stored and subsequently extracted. The thermal energy is generally extracted via the HTF 202. An electrical energy generation system 500 may be provided in connection to the PCM storage vessel 100, and/or the HTF receptacle 200. Generally, the electrical energy generation system is provided in thermal connection to the HTF receptacle 200. The electrical energy generation conversion unit may be in thermal connection to the second portion 200b of the HTF receptacle 200.

The extraction of thermal energy is performed to power a electrical energy generation system 500. The electrical energy generation system 500 converts thermal energy provided by the HTF 202 to electrical energy. The generated electrical energy generated by the electrical energy generation system 500 may be fed in to an electricity grid or electrical distribution network. The electrical energy generation system 500 may comprise a conversion unit 501 operating on the Stirling cycle, Rankine cycle, Brayton cycle, or any other heat engine capable of efficiently generating electrical energy from thermal energy to electrical energy.

The conversion unit 501 of the electrical energy generation system 500 is in thermal connection with the HTF. A heat exchanger may be used to transfer thermal energy from the HTF to the conversion unit 501. The heat exchanger may transfer thermal energy from the HTF to the working fluid of the conversion unit 501.

As described above, thermal energy may be provided to the HTF 202 via the PCM 102, and specifically via the PCM 102 through the PCM storage vessel 100.

A plurality of fluid conduits may be provided to the HTF receptacle 200 for the transfer of HTF. A heating fluid conduit 211 may be provided in connection to the HTF receptacle 200 at the portion for receiving thermal energy 210. The heating fluid conduit 211 may have a first end 212 in connection with the portion for receiving thermal 210. The heating fluid conduit 211 may have a second end 213 in connection with the portion for receiving thermal energy 210. HTF may be displaced through the conduit, from the first end 212 to the second end 213 via the external thermal energy source 400. The HTF may be displaced by a pump. The first and second ends 212, 213 may be arranged at the base, such as at the periphery of the base, of the convex protrusion at the tip portion 103. That is, they need not be directly at the apex of the convex protrusion at the tip portion 103.

Generally, the HTF 202 in the assembly is not in direct contact with the PCM storage vessel 100. The HTF 202 is comprised in the HTF receptacle 200 and thermal communication between the HTF 202 and the PCM 102 occurs via the thermally conductive wall 108 of the PCM storage vessel 108 and the inner wall 204 of the HTF receptacle 200. This means that the HTF 102 does not wet the outer layer of the thermally conductive wall 108. As the outer layer of the thermally conductive wall 108 is not wetted by HTF 102 the outer layer may be selected from a wider variety of materials making the assembly less costly to produce and improves reliability.

The HTF receptacle 200 surrounds only a portion of the PCM storage vessel 100. The HTF receptacle 200 does not surround the entire PCM storage vessel 100. Both enclosing only a portion of the PCM storage vessel 100 by the HTF receptacle 200, and enclosing the HTF within the HTF receptacle 200 makes maintenance easier to perform as the PCM storage vessel may be accessible without needing to drain the HTF receptacle 200 of the HTF 102.

The HTF receptacle 200, and in particular the second portion 200b, may be in the form of an annular cylinder, that is a cylinder having a central aperture 203, if the HTF receptacle 200 is arranged adjacent a cylindrical portion of the PCM storage vessel 100. The HTF receptacle 200 may be a toroid having a rectangular cross-section rotated around its central axis. The HTF receptacle 200 may be in the form of an annular tapered portion, that is a tapered portion having a central aperture 203. The HTF receptacle 200 having an annular tapered form is especially suitable if the HTF receptacle 200, and in particular the second portion 200b, is arranged adjacent the tapered portion 101, or if the entire PCM vessel 100 is a frusto-cone. For example, the HTF receptacle 200 may have the form of an annular frusto-cone having a central aperture 203 if the tapered portion 101 of the PCM storage vessel 100 is a frusto-cone. The second portion 200b may surround at least the base portion 104 of the inverted tapered portion 101 HTF receptacle 200. The second portion 200b does not surround the tip portion 103.

The HTF receptacle 200 may comprise at least one, such as a plurality of partitions 208 forming a single HTF receptacle 200. Each partition 208 may be a section of the entire of shape of the HTF receptacle 200. For example, each partition 208 may be a section of an annular cylinder having a central aperture 203. If, for example, the HTF receptacle 200 is formed to engage with the tapered portion 101 of the PCM vessel 100 then the each partition 208 may have the form of a portion of an tapered portion having a central aperture 203.

The external thermal energy source 400 may be a device or system adapted for supplying thermal energy to the HTF. The external thermal energy source 400 may for example be a solar radiation receiver at which sunlight is focused. The external thermal energy source 400 may be a device for converting electrical energy to thermal energy. The external thermal energy source 400 may be an immersion heating which heats HTF via the conversion of electrical energy to thermal energy. An immersion heater may be provided at the fluid conduit 211 between the first and second 212, 213 ends. The immersion heater is in thermal communication with the HTF. The immersion heater may heat the HTF in the fluid conduit 211.

The external thermal energy source 400 may be a device which provides thermal energy via electromagnetic radiation, such as an infrared heater. If the external energy source supplies thermal energy via electromagnetic radiation then the thermal energy source 400 need not be in direct contact with the HTF, as the thermal energy is transferred via radiation. An external thermal energy source 400 may be adapted such that radiation is directed towards the region for receiving thermal energy 210. The external thermal energy source 400 may also be adapted to act upon the fluid conduit 211 between the first and second ends 212, 213.

By heating the HTF with an external energy source 400 adapted to convert electrical energy to thermal energy the HTF may be heated with electrical energy which is otherwise not possible to input to an electricity network or grid. The electricity used to power the external thermal energy source 400 may be provided by photovoltaic panels. The photovoltaic panels may be provided in the vicinity of the PCM storage vessel 100, HTF receptacle 200 assembly to reduce transmission costs.

The external thermal energy source 400 may be a source of waste industrial heat such as an industrial gas-flare system. The heat from the gas flare generated may be used to heat the HTF, and thereafter the PCM.

In both of the electrical and gas-flare external thermal energy sources 400 thermal energy used to heat the HTF is low-cost and environmentally friendly as waste energy is used to heat the HTF. The waste energy may be stored in the PCM for periods when electricity can be provided to the electricity network or grid.

The external thermal energy source 400 may be adapted to heat HTF at a location being at a height greater than the height of the PCM vessel 100 and HTF receptacle 200 assembly. Height in such instances refers to the distance from ground-level. That is, the HTF may need to be displaced, vertically, to a position higher than the PCM vessel 100 and HTF receptacle 200. In such instances, a pump may be used to transfer the HTF through the conduit 211.

The HTF receptacle 200 may comprise at least one opening for the provision and/or extraction of HTF 202. The opening may be in addition to the first and second ends 212, 213 of the fluid conduit 211. The opening may also be used for the emptying of HTF, during maintenance. The HTF receptacle 200 may comprise a plurality of openings such as an aperture for a pump, an outlet for pumped HTF 202, and the first and second ends 212, 213 of the fluid conduit 211.

The HTF receptacle 200 may be manufactured from a metal, such as stainless steel, such as an austenitic chromium nickel stainless steel alloy comprising nitrogen and rare earth metals. The metal may be designed to be used at temperatures greater than about 550° C., the metal may for example be of type EN 1.4835. The inner 204 and/or outer 205 walls of the HTF receptacle may comprise, such as be composed of stainless steel.

The HTF 202 is a fluid. The HTF 202 may be a molten salt solution. Preferably the HTF 202 is molten metal such as molten sodium. Due to the high temperatures at which the HTF receptacle operates, and the thermal energy storage requirements water is not a suitable HTF. In some instances the HTF may be a gas. The first portion 200a of the HTF receptacle 200 may be filled with a first HTF 202. The second portion 200b of the HTF receptacle 200 may be filled with a second HTF 202, not being the same HTF as the that in the first portion 200a. However, they may be the same HTF 202. A different HTF in the first and second portions 200a, 200b may enable different and optimal pumps, valves and other elements to be selected depending on the operating temperature of each of the HTFs.

The HTF receptacle 200 may be provided with a fluid such as an inert gas, such as a nitrogen ($N_2$). A portion of the HTF receptacle 200 may be filled with the HTF 202, the remaining portion of the HTF receptacle 200, not filled with HTF 202, may be filled with the inert gas.

The PCM storage vessel 100 may be provided with a fluid such as an inert gas, such as a nitrogen ($N_2$). A portion of the PCM storage vessel 100 may be filled with the PCM 102, the remaining portion of the PCM storage vessel 100, not filled with PCM 102, may be filled with the inert gas.

The inert gas above reduces oxidation of the PCM 102 and/or HTF 202 even at high temperatures.

The HTF receptacle may be substantially gas tight at its upper portion 209 such that any gas leakage from the HTF receptacle 200 is minimized.

A system for the storage or thermal energy is provided wherein the system comprises a plurality of PCM storage vessels 100, and HTF receptacles 200 as described herein. Each of the plurality of assemblies 100, 200 may be interconnected such that the a single external thermal energy source 400 supplies thermal energy to the each of the plurality of regions for receiving thermal energy 210. Each of the assemblies may be interconnected via their respective fluidic conduit 211. A plurality of valves may be provided between the HTF receptacles 200 in the system such that the flow of thermal energy via HTF can be controlled. That is, the valves enable the controlling the flow of thermal energy to a subset of the plurality of PCM storage vessels 100 and HTF receptacle 200 assemblies, being less than the total number of assemblies in the system.

Each of the assemblies comprising a PCM storage vessels 100 and the HTF receptacle 200 in the system may be provided with a separate respective external source of thermal energy 400. In such a manner the temperature of each of the assemblies and the energy stored therein may be controllable separately.

Each of the assemblies comprising the PCM storage vessel 100 and the HTF receptacle 200 in the system may be connected to a respective energy conversion unit 501 for the generation of electrical energy.

A system may be housed in a housing. The housing may be a standard shipping container. A standard shipping container refers to container according to ISO 668:2013 Series 1 standards being 6.058 m (19 ft 10.5 in, called 20 ft) or 12.192 m (40 ft) long, 2.438 m (8 ft) wide, and 2.591 m (6 ft 6 in) high or 2.896 m (9 ft 6 in) high (high-cube). Housing the system in a standard shipping container enables the system to be shipped efficiently and thus reduces the total cost of installation of the thermal energy storage system. A system may comprise four assemblies each comprising a PCM storage vessel 100 and a HTF receptacle 200. In such a system the PCM storage vessels 100 and HTF receptacles 200 may be in a first portion of the shipping container. The conversion unit(s) 501 may be present in a separate, second portion of the shipping container. A wall may be provided between the first portion and second portion. The wall may act as a barrier for dust, radiant thermal energy, and safety shielding from the volume of PCM 102 and HTF 202 which may be maintained at temperatures of over 500° C. as described above. A housing, such as a shipping container, may have more than one second portion. For example, two conversion units 501 may be provided in a first second portion, and two conversion units 501 may be provided in a second second portion in a system comprising four conversion units 501.

As described above, the PCM storage vessel 100 enables the storage of thermal energy which can be extracted and used to power an electrical energy generation system. A system comprising a plurality of interconnected PCM storage vessels 100 and HTF receptacles 200 is especially useful when the amount of thermal energy which can be provided by the external thermal energy source 400 is greater than the amount of energy which can be stored in a single PCM storage vessel 100, and/or extracted by the conversion unit for converting thermal energy in to electrical energy. The above system has numerous advantages compared to a single large PCM vessel 100 with respect to reduced installation costs, and the ability to modulate which PCM vessel 100 and HTF receptacle 200 assemblies receive the thermal energy if each cannot be efficiently operated simultaneously.

The system comprising the plurality of assemblies may be provided within a housing.

A description of the process for thermal energy storage and retrieval will now be described with respect to the assembly comprising the PCM storage vessel 100 and HTF receptacle 200 and an external thermal energy source 400.

The HTF 202 comprised in HTF receptacle 200 receives thermal energy at the portion for receiving thermal energy 210 from the external thermal energy source 400. The HTF 202 may be continuously pumped through the conduit 211 via the external thermal energy source 400.

The HTF 202 may be heated to greater than 500° C., such as greater than 600° C., such as about 650° C.

A thermal energy transfer occurs from the HTF 202 to the PCM 102, such that the PCM 102 within the PCM storage vessel 100 is warmed. The temperature of the PCM 102 in the vicinity of the portion for receiving thermal energy 210 of the HTF receptacle 200 may be greater than 500° C., such as greater than 580° C., such as about 590° C.

The warmed PCM 102 in the vicinity of the HTF receptacle 200 may be less dense than the relatively cooler PCM 102 present in the PCM storage vessel 100. It may have undergone a phase change to liquid. The warmed PCM 102 may rise within the PCM storage vessel 100, the cooler, denser, possibly solidified PCM 102 may flow toward the region tip portion 103 of the tapered portion 101 of the PCM vessel 100. This process of free het convection, or natural heat convection, continues whilst the thermal energy is being supplied to the HTF receptacle 200.

In the above process the thermal energy may be supplied to the first portion 200a of the HTF receptacle 200.

The thermal energy present in the PCM 102 may be extracted via HTF 202 in thermal communication with the PCM storage vessel 100. HTF 202 in the HTF receptacle 200 is warmed through the wall of the PCM storage vessel 100, and through the wall of the HTF receptacle 200. The warmed HTF 202 may be pumped to a conversion unit 501 of an electrical energy generation system 500 for converting thermal energy in to electrical energy. The warmed HTF 202 may then warm the working fluid of the conversion unit 501. For example, the warmed HTF may be pumped to a Stirling engine. The Stirling engine may thereby convert the thermal energy extracted from the PCM 102 to generate electricity.

The thermal energy extracted from the PCM 102 may be extracted via the HTF 202 in the second portion 200b of the HTF receptacle 200.

In a separate arrangement the HTF receptacle 200 may comprise an internal heater for heating the PCM 102 in the PCM storage vessel 100 directly. This is similar to the PCM storage vessel 100 disclosed in Swedish patent application SE 1851338-2. However, instead of a region for receiving solar thermal energy (105 in the referenced application), a heater is provided to heat the PCM 101 directed at the region for receiving solar thermal energy (105 in the referenced application) making the region therefore a region for receiving thermal energy. The heater may be an infrared heater powered by electrical energy. The heater may be enclosed within an insulating wall. The HTF receptacle 200 is still present, and the PCM 102 is used to store thermal energy.

In a further separate arrangement, the HTF receptacle 200 may comprise at least one heater adapted to directly heat the HTF 102 within the HTF receptacle 200 without any pumping of the HTF to an external source of thermal energy. Such an arrangement comprises a PCM storage vessel 100, a HTF receptacle 200, and a heater within the HTF receptacle 200. The thermally conductive walls of the PCM vessel 100 are as described above. Thermal energy may be provided to the HTF 102 in the HTF receptacle 200 which is thereafter transferred and stored in the PCM 102 in the PCM vessel 100. Thermal energy is transferred via conductive walls of the HTF receptacle 200 and the PCM storage vessel 100.

The two arrangements presented above have the advantage that the HTF 102 does not need to be pumped to an external source of thermal energy and therefore installation costs may be reduced.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality.

The terms "a", "an", "first", "second" etc do not preclude a plurality. Reference signs in the claims are provided merely as a clarifying example and shall not be construed as limiting the scope of the claims in any way.

The invention claimed is:

1. An assembly for storing thermal energy comprising a phase change material, PCM, storage vessel and at least one heat transfer fluid, HTF, receptacle,
    the PCM storage vessel being defined by a thermally conductive wall, the PCM storage vessel comprising an inverted tapered portion, the inverted tapered portion having a tip portion and a base portion, the tip portion having a diameter less than the diameter of the base portion, the tip portion being arranged relatively beneath the base portion,
    the at least one HTF receptacle being provided adjacent to and in thermal communication with at least a portion of the PCM storage vessel, thermal communication between the PCM storage vessel and the at least one HTF receptacle occurring via the thermally conductive wall, the HTF receptacle comprising a portion for receiving thermal energy from an external thermal energy source, the portion being adjacent the tip portion of the inverted tapered portion; and
    wherein the assembly being adapted such that thermal energy provided to a PCM in the PCM vessel is substantially received at a first portion of the at least one HTF receptacle being adjacent and in thermal communication with the tip portion of the inverted tapered portion of the PCM vessel and thermal energy to be extracted from the PCM is substantially extracted at a second portion of the at least one HTF receptacle being distal the tip portion of the inverted tapered portion of the PCM vessel.

2. The assembly according to claim 1, wherein the external thermal energy source is separate from and not in direct communication with the PCM vessel.

3. The assembly according to claim 1, wherein the first portion is separate from the second portion such that they are not in direct thermal communication, and wherein they are in indirect thermal communication via the PCM storage vessel.

4. The assembly according to claim 1, wherein the first and second portions are separate HTF receptacles each for enclosing a separate volume of HTF.

5. The assembly according to claim 1, wherein the PCM vessel is substantially enclosed.

6. The assembly according to claim 1, wherein PCM storage vessel comprises a PCM and, the total volume of PCM in the assembly is comprised within a single PCM storage vessel.

7. The assembly according to claim 1, wherein the HTF receptacle surrounds at least a portion of the PCM vessel.

8. The assembly according to claim 1, wherein the PCM storage vessel comprises a phase change material, PCM, such as a metallic alloy, and the HTF receptacle comprises a heat transfer fluid, HTF, such as sodium.

9. The assembly according to claim 1, wherein the HTF receptacle comprises a fluid conduit for the transfer of HTF to the external thermal energy source, the fluid conduit having first and second ends in connection with the portion for receiving thermal energy.

10. The assembly according to claim 1, wherein the external thermal energy is provided by an immersion heater adapted to heat the HTF.

11. The assembly according to claim 1, wherein the energy provided to the external thermal energy source for heating the HTF is waste energy from an industrial process and/or electrical energy from photovoltaic panels.

12. The assembly according to claim 1, wherein the energy provided to the external thermal energy source is solar thermal energy.

13. The assembly according to claim 1, wherein the inverted tapered portion comprises a convex tip portion, and wherein the first portion abuts the convex tip portion.

14. The assembly according to claim 1, wherein the second portion substantially surrounds the inverted tapered portion of the PCM storage vessel, at a region distal the tip portion.

15. A system for the storage of thermal energy comprising a plurality of assemblies according to claim 1.

16. A system for the generation of electrical energy from thermal energy comprising at least one assembly according to claim 1, further comprising an electrical energy generation system for generating electrical energy from thermal energy, the electrical energy generation system being in thermal communication with the HTF receptacle via a fluidic conduit.

17. The system according to claim 16, wherein the system for generating electrical energy comprises a conversion unit operating on the Stirling cycle, Rankine cycle, Brayton cycle, or other heat engine capable of generating electrical energy from thermal energy.

18. The assembly according to claim 1, wherein the HTF is adapted to be heated to a temperature of greater than 500° C.

19. The system according to claim 15, wherein the HTF is adapted to be heated to a temperature of greater than 500° C.

20. The system according to claim 16, wherein the HTF is adapted to be heated to a temperature of greater than 500° C.

\* \* \* \* \*